US004001663B2

United States Statutory Invention Registration [19]

[11] Reg. Number: H1663

Yen

[45] Published: Jul. 1, 1997

[54] CONTROLLABLE IMPLOSIVE SOUND PROJECTOR

[75] Inventor: Nai-Chyuan Yen, Alexandria, Va.

[73] Assignee: United States of America, Washington, D.C.

[21] Appl. No.: 701,907

[22] Filed: Aug. 14, 1996

[51] Int. Cl.[6] ..... H04R 1/20

[52] U.S. Cl. ..... 367/146

*Primary Examiner*—Charles T. Jordan
*Assistant Examiner*—Meena Chelliah
*Attorney, Agent, or Firm*—Thomas E. McDonnell; Charles S. Stockstill

[57] ABSTRACT

The controllable implosive sound projector is comprised of a geometrically shaped cavity within a housing with a material across the face of the cavity. The air within the cavity is evacuated so as to form a vacuum causing a pressure differential to be formed across the material when the projector is submerged in a fluid. At a predetermined pressure differential the material is ruptured creating a shock wave at the face of the cavity which propagates into the cavity with a concave wave front deformation due to the confined boundaries of the cavity that forms a spherical shock wave at the interior of the cavity. At the focal point of the cavity, the spherical shock wave collapses and an impulse wave is generated that causes a pressure wave to radiate out from the opening into the fluid.

18 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTROLLABLE IMPLOSIVE SOUND PROJECTOR

BACKGROUND OF THE INVENTION

1. Field of the Invention

This invention relates to a means for generating an implosive sound and more specifically to an implosive sound projector that is controllable and emits a highly localized, spatially and temporally oriented acoustic wave for underwater communication, detection, and classification of submerged objects.

2. Description of the Related Art

Current technology for generating an impulsive sound waves in an aquatic medium is based on a detonation mechanism, such as imploding glass spheres, an explosive charge, or electric spark. An acoustic signal obtained by these methods is difficult to control because of the variation in input energy between explosive sources or spark gap deterioration when using an electric spark source, as well as the interference caused by bubble resonances. A broad band acoustic source can also be achieved with a frequency synthesizer, however the final signal is not localized in the time domain and the energy conversion efficiency is very poor due to the required compensation for the frequency response during electro-mechanical transduction. See, U.S. Pat. No. 4,805,726, Taylor et al., issued Feb. 21, 1989; U.S. Pat. No. 4,185,714, Pascouet et al., issued Jan. 29, 1980.

When a cavity suddenly implodes, or collapses, under hydrostatic pressure, an impulse sound is produced that can be measured by a remote listening device. Such an implosion sound has similar characteristics to that sound produced by an explosive but is much safer. Implosive sound is highly localized in time and space which is very useful for applications in areas that require high temporal resolution, for example, in undersea oil exploration. The selection of the size of the implosion sound projector depends on its particular application. Although fundamental relations described in this invention do not include the effect of scaling factor on the performance of implosion sound generation, the heat conduction and interface stability between the fluid and gas become important as its physical size increases.

SUMMARY OF THE INVENTION

The object of this invention is to provide an implosive sound projector that emits a controllable, highly localized, spatially and temporally oriented acoustic wave underwater.

Another objective of this invention is to provide an implosive sound projector that may be used multiple times without having to be reworked.

Another objective of this invention is to provide an implosive sound projector that may recovered after use.

These objectives and others are met by the use of a controllable implosive sound projector which is comprised of a cavity closed by a diaphragm within which the air inside has been evacuated so as to form a vacuum. When the diaphragm is ruptured, a shock wave is created at the face of the cavity that creates a concave wave front deformation due to the confined boundaries of the cavity. As the wave front progresses inward a spherical shock wave is formed at the interior of the cavity. At the focal, or focus, point of the cavity, the spherical shock wave collapses and an impulse wave is generated that is reflected back out of the cavity causing a pressure wave to radiate into free space that is measured by remote sensing devices.

DESCRIPTION OF THE PREFERRED EMBODIMENT

Figure 1:
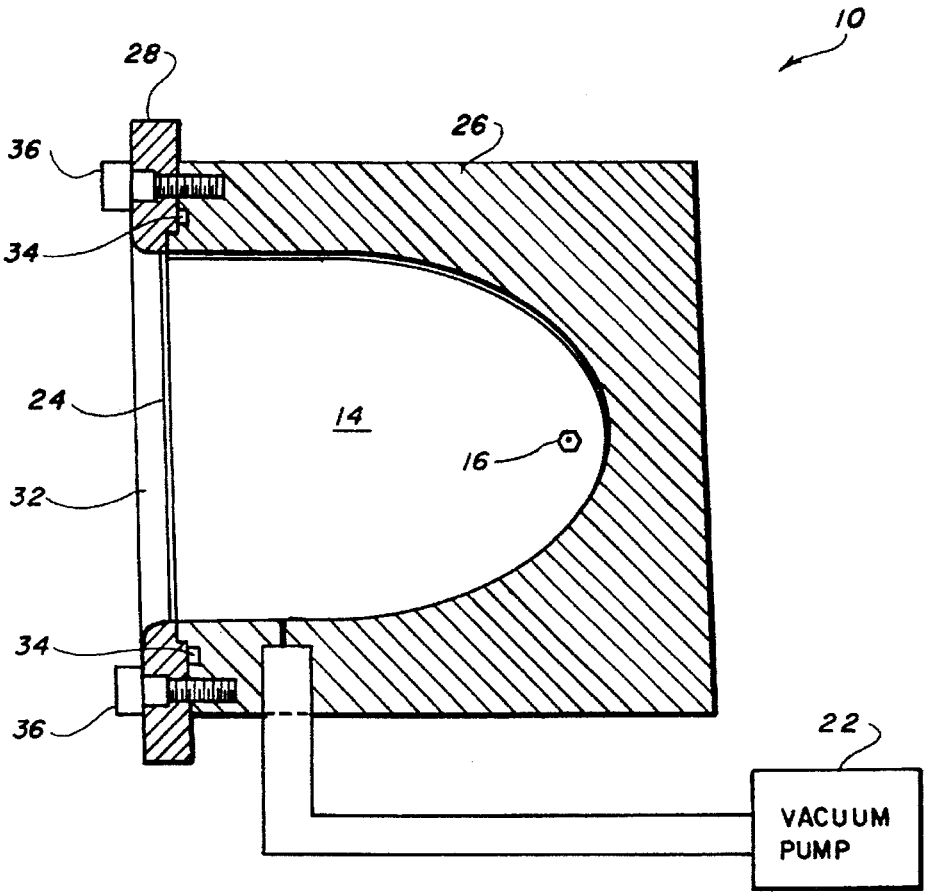
FIG. 1 shows the basic controllable underwater implosive sound projector for projecting an acoustic wave in one direction utilizing a diaphragm.

In the preferred embodiment, as shown in FIG. 1, the basic ISP 10 consists of a cavity 14 within a solid housing that is evacuated to a low pressure, nominally 0.006 atmospheres (the saturated vapor pressure at an ambient temperature of 20° C.) by a vacuum pump 22 so as to establish a initial pressure differential across an end cap or diaphragm 24. When the ISP is submerged in a medium to a predetermined external pressure, the diaphragm 24 will fracture or rupture. This rupture can be accomplished by either surface stretch of the diaphragm 24 due to a pressure differential or by a mechanical plunger (not shown) piercing the end cap after being triggered by a pressure sensor (not shown).

In this invention, an implosion sound is generated in a controlled manner by a controllable implosive sound projector (ISP) based on the mechanics of spherical collapse under high-low pressure differences in an artificial cavity. The simplest dynamic theory to describe the motion of a pressure wave generated by the introduction of a high pressure fluid into a cavity at a vacuum is in terms of potential and kinetic energy. This is expressed by the Rayleigh-Plesset equation $$R\frac{d^2R}{dt^2}+\frac{3}{2}\left(\frac{dR}{dt}\right)^2=\frac{1}{\rho}\left[p_v-p_o-2\frac{\sigma}{R}-4\mu\frac{\frac{dR}{dt}}{R}\right] \quad (1)$$

where R is the radius of the collapsing cavity, $p_v$ is the internal pressure inside the cavity, $p_O$ is the external static ambient pressure outside the cavity, $\sigma$ the surface tension of the fluid, $\rho$ the density of the fluid, and $\mu$ its shear viscosity. This equation assumes that the shape of the cavity remains a perfect sphere during its collapse and neglects the details of the thermal dynamics, heat conduction, and phase transition.

The collapse velocity is dimensionless, expressed in terms of the sound velocity in the gas, the Mach number, M. Under most conditions, the final collapsing bubble velocity exceeds M=1. Therefore, it is obvious that a spherical implosion shock wave will be formed inside the cavity during the final stage of collapse that converges towards the center creating a high pressure pulse by virtue of the energy concentration. The implosion shock will be reflected after reaching the center of the cavity and its magnitude will be reinforced up to 26 times its original amplitude according to the spherical shock wave theory. See. G. B. Whitham, *Linear and Nonlinear Waves,* Wiley-Interscience, New York, 1974. The reflected implosion shock wave will go through the collapsed cavity boundary after multiple reflection at the interface, which enhances the intensity of the shock wave, and propagates out into free space. It eventually becomes a weak shock due to spherical spreading and behaves like an impulsive acoustic wave.

A further analysis of shock wave theory reveals that the Chester-Chisnell-Whitham (CCW) model is well suited to this invention. See, Whitham, *A New Approach to Problems of Shock Dynamics. Part I Two-Dimensional Problems*, J. Fluid Mech. 2, pp. 145–171, 1957; and Whitham, *A New Approach to Problems of Shock Dynamics, Part II Three-Dimensional Problems*, J. Fluid Mech. 5, pp. 369–386, 1959. The model is based on the conservation laws and determines the fluid quantities by the Rankine-Hugoniot relations across the shock. The result of this model is an equation for the Mach number of the shock as a function of the cross-sectional area A of a ray tube:

$$\frac{\lambda(M)MdM}{M^2-1}+\frac{dA}{A}=0 \tag{2}$$

where, for the ideal gas, $$\lambda(M)=\left(2\sigma+1+\frac{1}{M^2}\right)\left(1+\frac{2}{\gamma+1}\quad\frac{1-\sigma^2}{\sigma}\right) \tag{3}$$

and $$\sigma^2=\frac{(\gamma-1)M^2+2}{2\gamma M^2-(\gamma-1)} \tag{4}$$

and $\gamma$ is the adiabatic index.

Figure 2:
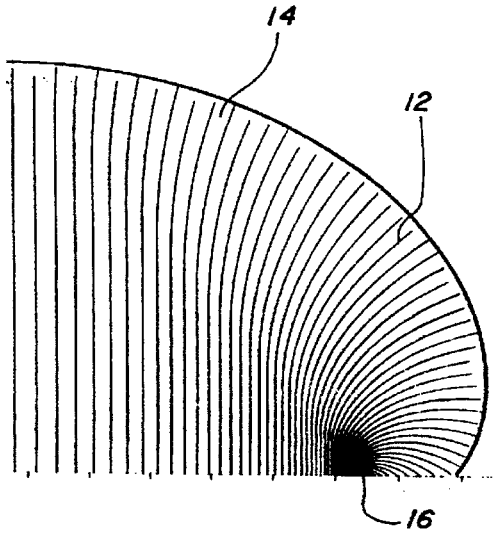
FIG. 2 shows the relationship of the shock wave to the cavity wall causing the plane shock wave to converge on a focal point.
Figures 3A, 3B, 3C, 3D, 3E, 3F, 3G:
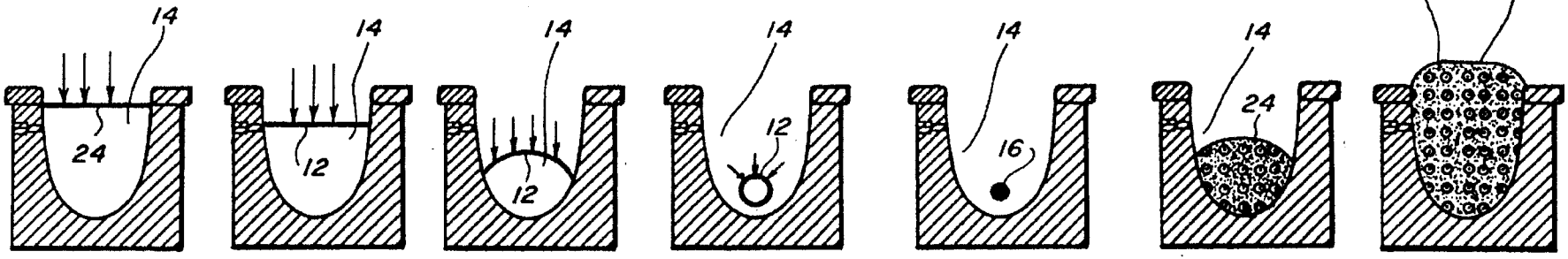
FIGS. 3*a*–3*g* shows sequentially the collapse of the shock wave and the formation of the reflected wave upon bursting of the diaphragm.

The nonlinear relationship of equation (2) treats the strength of the shock wave 12, as shown in FIG. 2, as proportional to the area in a ray tube. This is similar to geometrical acoustic ray theory except that the local sound speed is not constant, hence the velocity of the shock wave 12 front movement will be affected by changes in its cross section. The CCW model is applied to this invention to simulate the implosion by an area charge in a shock ray tube. By adjusting the interior boundary curvature of an open end cavity 14, a plane shock wave 12 can be forced to converge to a single point 16, or locus, which forms a focal point. The locus 16 of a shock wave 12 front is modified as it propagates from the cavity's 14 opening toward the locus 16. The plane shock wave 12 front is forced to converge to a single point along the axis. A numerical algorithm based on the CCW is used to determine the focal point 16 from the shape of the cavity 14. For an axisymmetrical closed cavity, its profile can be computed from the following equation: where $\lambda_n$ is the slope of the surface nth segment and $\Delta\theta$ is the $$x_{(n+1)}=\frac{x_n-\lambda_{n+1}y_n-\lambda_{n+1}x_n\tan(n\Delta\Theta)}{1-\lambda_{(n+1)}\tan(n\Delta\Theta)} \tag{5}$$

$$y_{(n+1)}=\frac{[x_n-x_{(n+1)}]}{\lambda_{(n+1)}} \tag{6}$$

angular change between segments. Equations (5) and (6) serve as a guide for the design of the artificial cavity of the ISP described below.

Referring again to FIG. 1, the contours of the geometrically shaped cavity 14 or chamber may be formed within the solid housing 26 by any other method known to those knowledgeable in the field, preferably the shape of the cavity is a graduated decreasing closed end cylinder as determined by Equation (5). The housing 26 is preferably bronze, or a composite material, however, any non-corrosive metal or non-corrosive rigid material may be used. A closure plate 28 with a diaphragm 24, or end plate, positioned within a metallic ring 32 seals the open face of the cavity 14. The diaphragm 24 is preferably a plastic sheet or metallic film, however any similar material may be used. To assure a leak free assembly, the closure plate 28 has an "O" ring 34, preferably natural rubber, between its inner face and the housing 26. A plurality of screws 36, or other similar fastening devices known to the art, secures the closure plate 28 to the housing 26 so as to form a leak free seal.

At atmospheric pressure, a vacuum is created inside the cavity 14 of the ISP 10. Referring now to FIGS. 3*a* through 3*g*, as the ISP 10 is submerged in a medium, a static differential pressure $\Delta P$ is created between the pressure within the cavity and the external pressure of the surrounding medium which is proportional to the fracture $\Delta P$ of the diaphragm 24, FIG. 3*a*. Upon reaching a predetermined external pressure, the differential pressure between the outside medium and the cavity 14 ruptures the diaphragm 24 allowing the outside medium to enter the lower pressure area of the cavity 14, compress the lower pressure air inside of the cavity 14, and thereby form a shock wave 12, FIG. 3*b*, which propagates along the inner walls of the cavity 14. The shock wave 12 is deformed due to the confined boundary, FIG. 3*c*, and forms a spherical shock wave as it approaches the focal point 16, FIG. 3*d*, which collapses about the focal point 16, FIG. 3*e*. (The duration of the main pressure peak is controlled by the thickness of the shock front, which depends on the properties of a host gas (viscosity and mean free path) and the location of the focal point 16 is determined by the contour of the cavity 14 walls.) An impulse wave 24 is generated by the reflection of the shock wave 12, FIG. 3*f*, as it collapses, which is radiated out of the face of the ISP 14 into free space 26 through the open end where it can be measured by remotely placed listening devices (not shown).

Figure 4B:
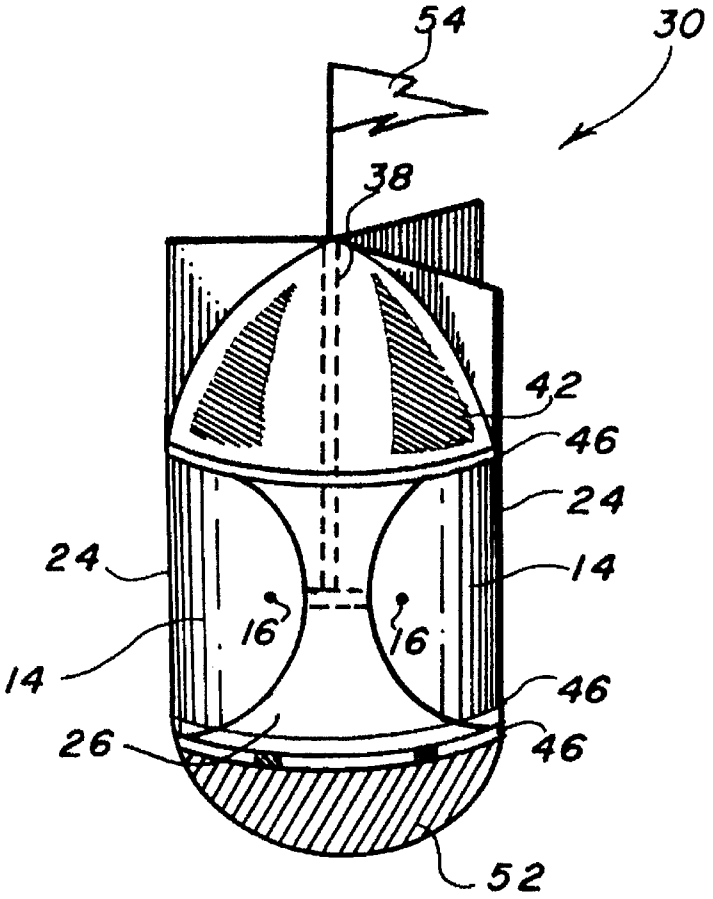
FIG. 4*b* shows a controllable underwater implosive sound projector utilizing a diaphragm that is capable of omnidirectional projection of an acoustic wave and is recoverable for rework and reuse.
Figure 4A:
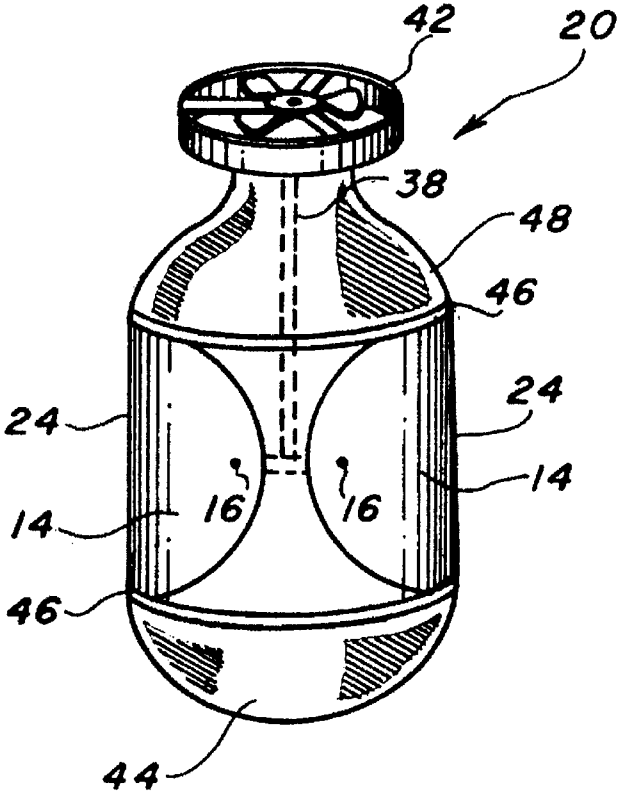
FIG. 4*a* shows a controllable underwater implosive sound projector utilizing a diaphragm capable of omnidirectional projection of an acoustic wave.

The basic ISP 10, described above, may be adapted to many different configurations, such as, in another preferred embodiment 20, the disposable omnidirectional devices is shown, FIG. 4*a*. The cavity 14 in this embodiment is positioned around a housing 26 with the diaphragm 24 being secured to the housing 26 by circular rings 46. Prior to deployment, the cavity 14 is evacuated by a vacuum pump (not shown) through a exhaust line 38, similar to that described above. When deployed in a medium such as sea water, the rate of descent of this embodiment 20 is controlled by a weight 44 and it is prevented from tumbling upon deployment by fins 42 which maintain a downward direction of sink. When the diaphragm 24 reaches a predetermined depth and fragments, a reaction within the cavity 14, similar to that described above, occurs and an omnidirectional impulse wave is propagated through the external medium.

Another preferred embodiment is a recoverable ISP 30, FIG. 4*b*. The design is similar to the previously described embodiment 20 but has a releasable weight 52 at the opposite end of the ISP 30 from a watertight flotation compartment 42. Once the reusable ISP 30 implodes a similar reaction within the cavity 14 occurs and the ISP 30 is returned to the surface. This is accomplished by a release of the weight 52 by a mounting 46 made of any type material soluble in sea water, such as manganese, decaying. The time to release of the weight 52 is determined by the type of material used for the mounting 46 and its thickness. Once on the surface, the location of the ISP 30 is determined by the use of a radio transmitter (not shown) or a visual recognition signal 54, such as a flag or a flare.

In another preferred embodiment, the implosive sound projector 40 having a capability of repeated operation without removal from the submersion medium. After operation, as described above, the end cap 24 in the ISP 40 is replaced without removal of the ISP 40 from the medium. This is accomplished by having a diaphragm 24 that may be replaced at depth, after rupture, by having a continuous roll of diaphragm 24 material on a supply roller 56 which is drawn over the face of the cavity 14 after fracture by roller 57. The activation of the rollers 56 and 57 is initiated by a signal from a remote location, such as the ocean surface, through a control/power line 58 attached to a structural member (not shown) suspending the ISP 40. Once the new portion of diaphragm 24 material has been drawn over the face of the cavity 14, a vacuum is applied to the cavity 14 through a vacuum line 38, also attached to the structural member (not shown), which removes any fluid within the cavity 14 thereby creating a vacuum within the cavity 14 and the process ready to repeat itself.

Figure 5A:
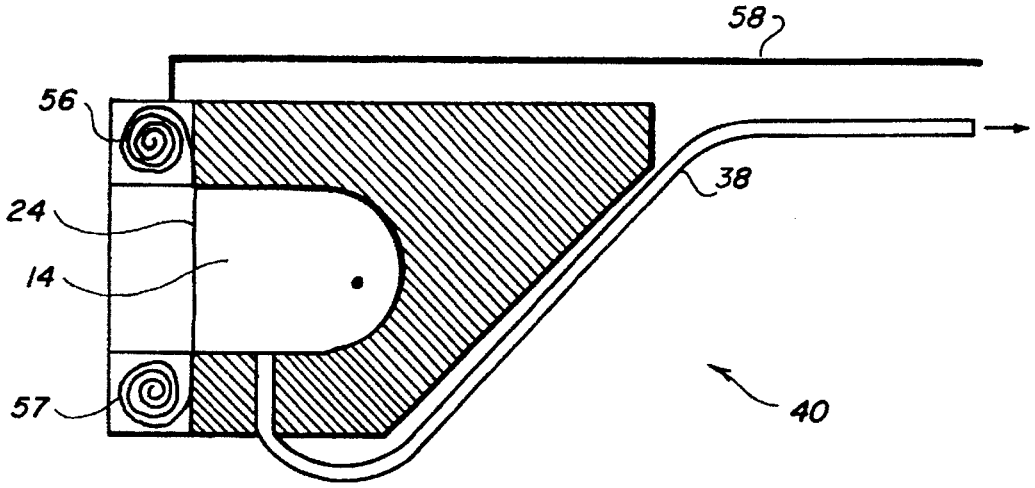
FIG. 5*a* shows a controllable underwater implosive sound projector utilizing a diaphragm capable of multiple acoustic wave projections without rework.
Figure 5B:
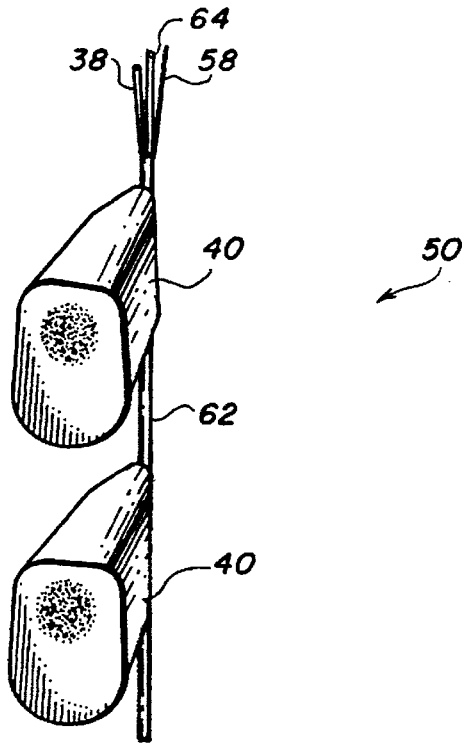
FIG. 5*b* shows an array of controllable underwater implosive sound projectors utilizing a diaphragm that is capable of multiple acoustic wave projections without rework.

Because of its repeatability, this embodiment 40 may be used to form an array 50, such as shown in FIG. 5*b*, to produce a steerable beam. A array 50 is comprised of a structural member 64, or cable, support, a control/power line 58, a vacuum line 38, and ISPs 40 placed at intervals of less than one-half wavelength of sound in water along its length. When the ISPs 40 simultaneously operated, as previously described, a group of acoustical waves are generated that have a directional radiation pattern with minimal sidelobes is formed.

Figure 6:
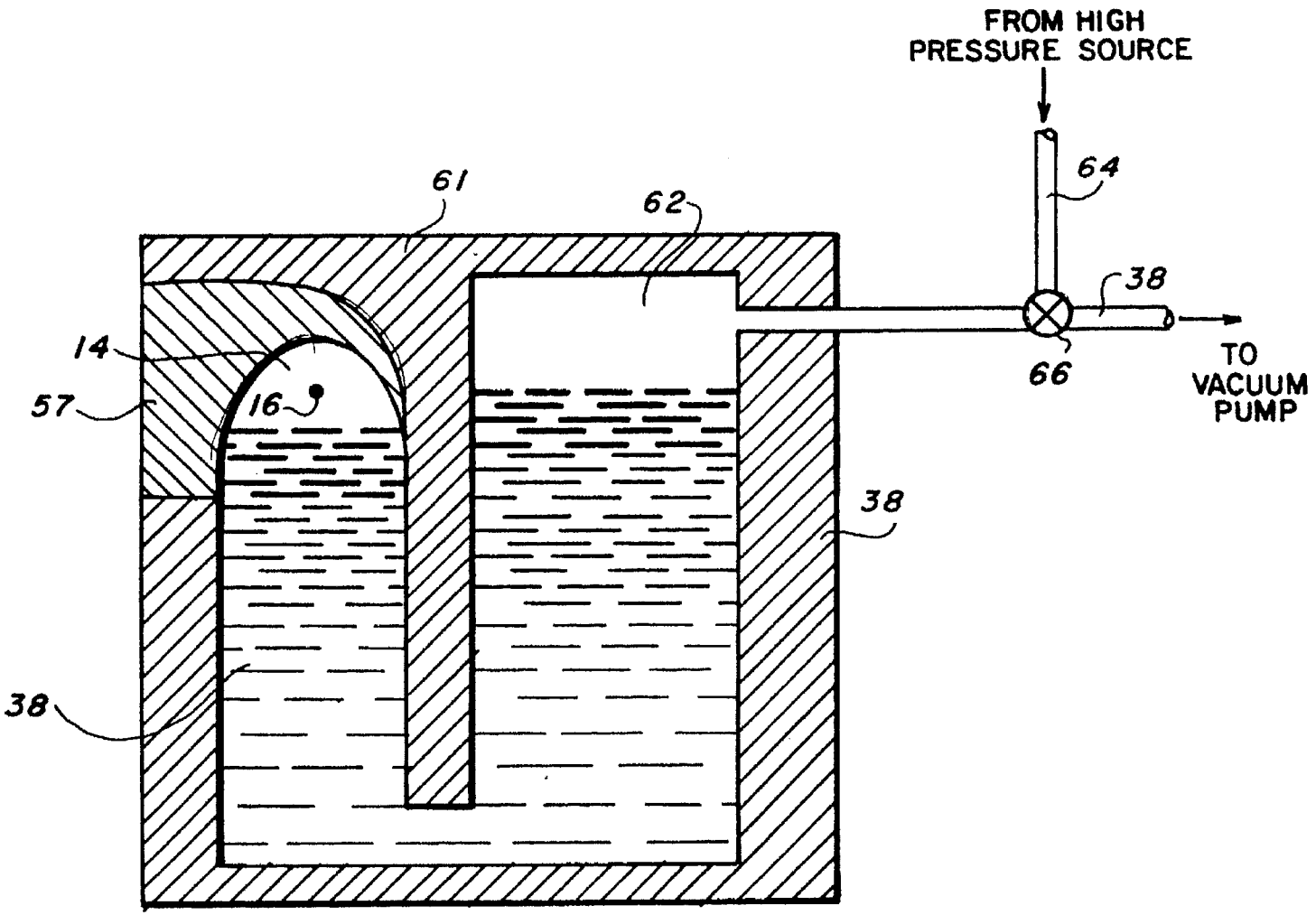
FIG. 6 shows a controllable underwater implosive sound projector utilizing a hydraulic fluid instead of a diaphragm.

Another preferred embodiment of the ISP 60 is shown in FIG. 6. This embodiment of the ISP 60 does not use a diaphragm 24, as do the previous embodiments, although the theory of operation of this embodiment of the ISP 60 is the same as previously described. The method of implementation of the theory, however, differs. A housing 61 has two geometrically shaped cavities, 14 and 57, similarly shaped as previously described, and having the same locus 16. The first cavity 57, or reflective cavity, is filled with a material acoustically transparent to water, such as polyeurethane. The second cavity 14, or impact cavity, is disposed so that a geometrically shaped upper portion of the second cavity 14 protrudes into the first cavity 57. The impact cavity 14 is filled with an incompressible fluid 38 supplied by a plenum 62 or reservoir. As the pressure within the plenum 62 is lowered by a vacuum applied to the plenum 62 through a vacuum line 38 causing the plenum 62 to become a vacuum chamber. By withdrawing the fluid 38 from the impact cavity 14, the volume of the impact cavity 14 increases resulting in a vacuum being generated within the upper portion of the impact cavity 14. When a pressure equal to a predetermined differential pressure between the evacuated portion of the impact cavity 14 and free space is reached, a valve 66 is activated through a control line (not shown) allowing air from a high pressure source (not shown) to enter the plenum 62 through the pressure line 64 changing the plenum 62 from a vacuum chamber to a pressure chamber. The inrushing air acts as a hammer forcing the fluid 58 into the impact cavity 14 to create the previously described pressure wave in the impact cavity 14 which is not only reflected back into the impact cavity 14, where the force of the pressure wave collapses around the locus 16 and is transferred to the reflective cavity 57 as an impulse wave radiating out from the common locus 16. The wall of the reflective cavity 57, serving as a reflector, directs the impulse wave toward the opening of the reflective cavity 57 where, as previously described, it is transmitted into free space as an acoustic wave. Once the impulse wave has discharged into free space, the process may again be repeated. This embodiment of the ISP 60 may also be deployed in a reusable array capable of repeatedly producing a steered acoustic wave in the surrounding medium.

Use of a vacuum to create an implosion is a much safer method than utilizing explosives or electrical sparks. Viewed overall, in addition to being controllable, the ISP is a much cheaper and safer device to prepare, manufacture and use than the devices currently in use. This invention provides an implosive sound projector that emits a controllable, highly localized, spatially and temporally oriented acoustic wave underwater that may be used multiple times without having to be reworked and may recovered after use.

It will be understood by those skilled in the art that still other variations and modifications are possible and can be affected without detracting from the scope of the invention as defined by the claims.

What is claimed is:

1. An implosive sound projector comprised of:

a housing having a geometrically shaped cavity therein with an open end;

an end cap having an internal and external face sealing said open end of the cavity capable of being fractured when a predetermined differential pressure is applied across the end cap;

means for creating a vacuum within said cavity, the vacuum creating a differential pressure between the internal and external faces of the end cap when the projector is submerged in a medium; and, means for fracturing the end cap upon reaching the predetermined differential pressure, allowing the medium to enter the cavity upon fracture causing a shock wave to be generated that propagates along the cavity walls focused to a point within the cavity where it collapses and creates a impulse wave which propagates out of the open end of the cavity into free space as a pressure wave.

2. An implosive sound projector, as in claim 1, wherein said means for fracturing the end cap is an end cap material having a predetermined fracture strength, the fracture being induced by the predetermined differential pressure across the internal and external faces of the end cap.

3. An implosive sound projector, as in claim 2, wherein material is a plastic sheet.

4. An implosive sound projector, as in claim 2, wherein material is a metallic film.

5. An implosive sound projector, as in claim 1, wherein said means for fracturing the end cap is a mechanical plunger activated by the predetermined differential pressure across the internal and external faces of the end cap piercing the end cap.

6. An implosive sound projector, as in claim 1, is further comprised of a means for replacing the end cap after fracture without removing the projector from the medium.

7. An implosive sound projector, as in claim 1, wherein the housing is made of a non-corrosive metal.

8. An implosive sound projector, as in claim 1, wherein the housing is made of a composite material.

9. An implosive sound projector, as in claim 1, wherein the housing is made of a material selected from a group consisting of non-corrosive metal and composite material.

10. An implosive sound projector, as in claim 7, wherein the non-corrosive metal is bronze.

11. An implosive sound projector, as in claim 7, wherein the non-corrosive metal is stainless steel.

12. An implosive sound projector to create acoustic wave at a predetermined external pressure comprised of:

a housing having a first geometrically shaped cavity therein with an open end;

said first cavity filled with a material acoustically transparent to water;

a second cavity, a geometrically shaped portion of which protrudes partially into said first cavity;

said second cavity being filled with an incompressible fluid;

said first and second cavity having a common locus;

a plenum, partially filled with the incompressible fluid, connected to said second cavity so that the incompressible fluid flows between said second cavity and said plenum;

means for evacuating said plenum thereby causing the incompressible fluid to flow from said second cavity into said plenum thereby creating a vacuum in said second cavity;

means for generating an impact pressure wave in the evacuated plenum at the predetermined external pressure thereby creating a pressure wave in said second cavity as the incompressible fluid is forced back into the evacuated second cavity which collapses around the common locus and creates a impulse wave which propagates out of the open end of said first cavity into free space as an acoustic pulse.

13. An implosive sound projector, as in claim 12, wherein the material acoustically transparent to water is polyurethane.

14. An implosive sound projector, as in claim 12, wherein the means for evacuating the reservoir is a vacuum pump.

15. An implosive sound projector, as in claim 12, wherein the incompressible fluid is a hydraulic fluid.

16. A method for creating an acoustic pulse when submerged in a fluid to a predetermined pressure comprising the steps of:

forming a geometrically shaped cavity within a housing having an open end;

sealing the open end of said cavity with an end cap that will fail upon application of a predetermined differential pressure across the end cap; and creating a vacuum within said cavity, the vacuum creating the predetermined differential pressure between the fluid and the cavity, thereby causing the end cap to rupture allowing the fluid enter said cavity causing a shock wave to be generated that propagates along said calvities walls and is focused at a point within said cavity where it collapses and creates a reflected impulse wave which propagates out of the open end of said cavity as an acoustic wave into free space.

17. A method for generating an acoustic pulse when a device is submerged in a fluid to a predetermined external pressure comprising the steps of:

forming a first geometrically shaped cavity in a housing that is filled with a material acoustically transparent to water, said cavity having an open end;

forming a second cavity in the housing that partially protrudes into said first cavity;

said first and second geometrically shaped cavity having a common locus;

creating a vacuum within said second cavity; and injecting a medium under pressure into the vacuum created within said second cavity when the device is submerged in the fluid to the predetermined external pressure thereby causing a shock wave to be generated within said second cavity that collapse around the locus creating an impulse wave which propagates outward through the first cavity as a acoustic wave.

18. A method for replacing an end cap across an open end of an implosive sound projector without removing the projector from the submersion medium, comprising the steps of:

winding a predetermined length of end cap material on rotatable shafts located at a first and second end of said material;

placing said material over the open end of the implosive sound projector cavity;

activating a takeup roller after failure of said material, drawing a new portion of material across the open end of the implosive sound projector; and sealing the end cap material to the open face of the implosive sound projector by excavating a fluid within the cavity.

* * * * *